United States Patent
Widell

(10) Patent No.: US 8,649,381 B2
(45) Date of Patent: Feb. 11, 2014

(54) ADMISSION CONTROL IN A WIRELESS COMMUNICATION SYSTEM

(75) Inventor: Daniel Widell, Vikbolandet (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 162 days.

(21) Appl. No.: 13/384,775

(22) PCT Filed: Aug. 25, 2009

(86) PCT No.: PCT/SE2009/050948
§ 371 (c)(1),
(2), (4) Date: Jan. 19, 2012

(87) PCT Pub. No.: WO2011/025418
PCT Pub. Date: Mar. 3, 2011

(65) Prior Publication Data
US 2012/0300713 A1    Nov. 29, 2012

(51) Int. Cl.
*H04L 12/28* (2006.01)
(52) U.S. Cl.
USPC .............. 370/395.21; 370/329; 370/468
(58) Field of Classification Search
USPC ............................ 370/329, 395.21, 468
See application file for complete search history.

(56) References Cited

U.S. PATENT DOCUMENTS

| | | | |
|---|---|---|---|
| 7,349,338 B2 * | 3/2008 | Balachandran et al. | 370/232 |
| 7,385,954 B2 * | 6/2008 | Gopalakrishnan et al. | 370/335 |
| 8,107,513 B2 * | 1/2012 | Poegel et al. | 375/150 |
| 2005/0013303 A1 * | 1/2005 | Gopalakrishnan et al. | 370/395.21 |
| 2006/0002318 A1 | 1/2006 | Kuurne | |
| 2010/0254304 A1 * | 10/2010 | Poegel et al. | 370/328 |

FOREIGN PATENT DOCUMENTS

| | | |
|---|---|---|
| EP | 1069736 A1 | 1/2001 |
| WO | 02/39769 A1 | 5/2002 |
| WO | 03/098948 A1 | 11/2003 |

* cited by examiner

*Primary Examiner* — Phuc Tran
(74) *Attorney, Agent, or Firm* — Murphy, Bilak & Homiller, PLLC

(57) ABSTRACT

Method and arrangement in a base station controller for admission control of a user equipment, to be served by a base station controlled by the base station controller, the base station, the base station controller and the user equipment are comprised within a wireless communication system. The method comprising the steps of receiving an admission request from the user equipment, computing an admission criteria value K, calculating a user weight value W for the user equipment, comparing the calculated user weight value W with the computed admission criteria value K, admitting the user equipment to be served by the base station, if the calculated user weight value W is smaller than the computed admission criteria value K.

8 Claims, 5 Drawing Sheets

300

ADMISSION CONTROL IN A WIRELESS COMMUNICATION SYSTEM

TECHNICAL FIELD

The present invention relates to a method and arrangement in a base station controller. More in particular, the present invention relates to a mechanism for admission control of a circuit switched service within a wireless communication system.

BACKGROUND

In previous admission control solutions for General Packet Radio Service (GPRS) or Enhanced General Packet Radio Service (EGPRS), the admission control is performed by predetermine a strictly limited number of users allowed per packet data channel. Alternatively, if Ericsson Instant Talk is used, the admission control may be performed with regard to guaranteeing a certain bitrate. The multimedia telephony standard MMTel is a driver for Voice over Internet Protocol (VoIP) services in Global System for Mobile communications (GSM), based on packet switched data.

According to previously used solutions, no regard is taken how much of the total resource a user is using for VoIP. Users with bad radio propagation conditions will need a bigger part of the total resource than a user with good radio propagation conditions. Further there is no functionality for when to allow or deny circuit switched services to take resources from packet switched services.

SUMMARY

It is the object to obviate at least some of the above disadvantages and provide an improved performance within a wireless communication system.

According to a first aspect, the object is achieved by a method in a base station controller for admission control of a user equipment to be served by a base station. The base station is controlled by the base station controller. The base station, the base station controller and the user equipment are comprised within a wireless communication system.

The method comprises the steps of receiving an admission request from the user equipment. Also, the method comprises computing an admission criteria value K. Further, the method comprises calculating a user weight value W for the user equipment.

Additionally, the method comprises comparing the calculated user weight value W with the computed admission criteria value K. Furthermore, the method comprises admitting the user equipment to be served by the base station, if the calculated user weight value W is smaller than the computed admission criteria value K.

According to a second aspect, the object is also achieved by an arrangement in a base station controller for admission control of a user equipment, to be served by a base station controlled by the base station controller. The base station, the base station controller and the user equipment are comprised within a wireless communication system.

The arrangement comprises a receiver. The receiver is adapted to receive an admission request from the user equipment. Further, the arrangement comprises a computing unit. The computing unit is adapted to compute an admission criteria value K. Also, in addition, the arrangement comprises a calculator. The calculator is adapted to calculate a user weight value W for the user equipment. Additionally, the arrangement comprises a comparison unit. The comparison unit is adapted to compare the calculated user weight value W with the computed admission criteria value K. Furthermore, the arrangement comprises an admitting unit. The admitting unit is adapted to admit the user equipment to be served by the base station, if the calculated user weight value W is smaller than the computed admission criteria value K.

Previously known methods have a fixed limit on the number of users allowed on each PDCH. However, some services only require a small fixed bandwidth.

By providing a method and arrangement in a base station controller which does not take into consideration the radio quality each user is experiencing, the invention increases the number of users that can be served with certain services.

Further, the present method and arrangement provides a limit on how many PDCHs that are required to provide the users with a satisfying service. Thus a limit on how many PDCHs that can be used for circuit switched telephony in the GSM system is provided, hence improving general performance and efficiency within the wireless communication system.

In addition, the present method and arrangement provides a functionality for permitting circuit switched services to take resources from packet switched services.

Other objects, advantages and novel features of the invention will become apparent from the following detailed description of the invention.

BRIEF DESCRIPTION OF THE DRAWINGS

Embodiments of the present invention will now be described more in detail in relation to the enclosed drawings, in which.

DETAILED DESCRIPTION

The invention is defined as a method and an arrangement in a base station controller, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
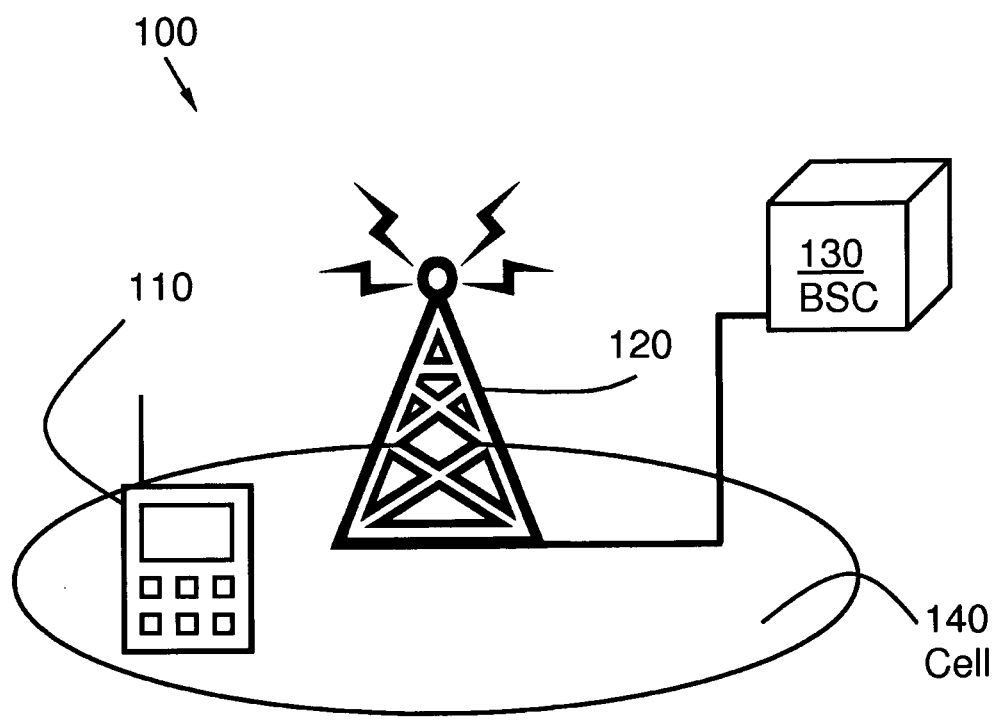
FIG. 1 is a schematic block diagram illustrating a wireless communication system, wherein the present solution may be applied.

FIG. 1 is a schematic illustration over a wireless communication system 100. The wireless communication system 100 comprises at least one base station 120 and is arranged to comprise a user equipment (UE) 110, which may transmit data as part of a particular service. The base station 120 is connected to a base station controller (BSC) 130. The base station 120 is further arranged to send and receive wireless signals to and from the user equipment 110, and/or other user equipments situated within the cell 140.

Although only one base station 120 is shown in FIG. 1, it is to be understood that another configuration of base station transceivers may be connected through, for example, other network nodes, to define the wireless communication system 100. Further, the base station 120 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the user equipment 110 may be represented by a wireless communication device, a wireless communication terminal, a mobile cellular telephone, a Personal Communications Systems terminal, a Personal Digital Assistant (PDA), a laptop, computer or any other kind of device capable of managing radio resources.

The wireless communication system 100 may be based on technologies such as e.g. Universal Mobile Telecommunication Services (UMTS), Terrestrial Radio Access Network (UTRAN) Long-Term Evolution (LTE), also referred to as e-UTRAN, Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA) etc, just to mention some few arbitrary and none limiting examples. Further, as used herein, the wireless communication system 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

However, in the subsequent description of the present solution, the wireless communication system 100 is based on GSM related technology.

The expression "downlink" is here used to specify the transmission from the base station 120 to the user equipment 110, while the expression "uplink" is used to denote the transmission from the user equipment 110 to the base station 120.

The base station 120 is further adapted to schedule the uplink transmissions from the user equipment 110, to the base station 120. In order to grant a particular user equipment 110 access to a particular uplink resource, a grant is sent from the base station 120 to that particular user equipment 110, based on e.g. a scheduling request sent by the user equipment 110 as the user equipment 110 may desire to access a certain service. The service may be circuit switched or packet switched, according to some embodiments.

The base station controller 130 may be connected to a plurality of base stations, e.g. tens or even hundreds of base stations. According to some embodiments, the base station controller 130 may handle e.g. allocation of radio channels, receive measurements from the user equipment 110, control handover of the user equipment 110 from the base station 120 to another base station etc.

The base station controller 130 may be a robust element in the wireless communication system 100. It may not be limited to serve exclusively as a control node for the base station 120, but may further be adapted to serve as a full switching centre, according to some embodiments, as well as e.g. an Signalling System Number 7 (SS7) node with connections to the Mobile Switching Centre (MSC) and serving GPRS support node (SGSN), when using GPRS technology. It may further provide data to the operation support subsystem (OSS) and/or to the performance measuring centres.

Furthermore, the base station controller 130 may be based on a distributed computing architecture according to some embodiments, with redundancy applied to critical functional units to ensure availability in the event of fault conditions. Redundancy may possibly extend beyond the base station controller equipment itself and may be used in the power supplies and/or in the transmission equipment.

In addition, the base station controller 130 may comprise or be connected to databases comprising information such as e.g. carrier frequencies, frequency hopping lists, power reduction levels, receiving levels for cell border calculation, just to mention some few arbitrary examples.

The present invention introduces a normalized total capacity of the radio resource. A user equipment 110 will be allocated a portion of that total capacity, that is proportional to the radio conditions that particular user equipment 110 at the moment is experiencing.

A new user equipment 110 using a packet service e.g. VoIP service will be allowed access and resources if there is enough total capacity to accommodate that user equipment 110. Further, new user equipment using circuit switched services may not be allowed to starve out existing packet service users with VoIP service, who has already been allocated resources, which will be further explained in association with the subsequent Figures.

The present method aims at increasing the number of user equipments that can be served with certain services. Further, the present method and arrangement provide a limit on how many PDCHs that are required to provide the user equipments with a satisfying service. Thus a limit on how many PDCHs that may be used for circuit switched telephony in the wireless communication system 100 is provided.

Figure 2:
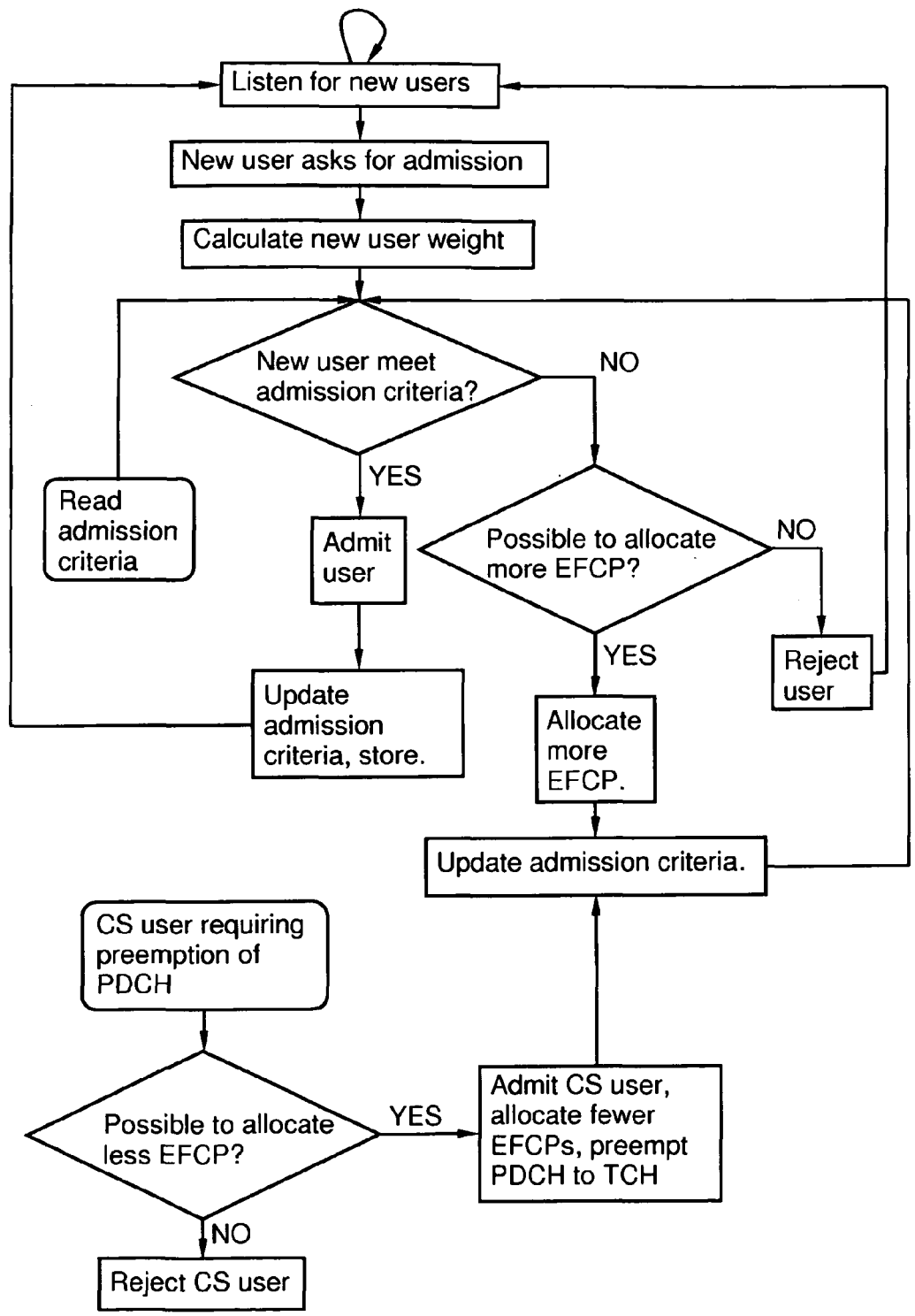
FIG. 2 is a conceptual illustration depicting an overview of possible method steps, according to some embodiments.

FIG. 2 is a conceptual illustration, depicting an overview of possible method steps in a flow chart of the present method, according to some embodiments.

Thus, according to embodiments of the present invention, the base station controller 130 is continuously listening for new user equipments, requesting a VoIP service. When a new user equipment i asking for admission is detected, a user weight value Wi is computed for that user equipment i, given certain radio conditions. Thus:

$$Wi = \frac{1}{Mi} \quad (1)$$

where Mi denotes the maximum number of allowed user equipments given the same radio conditions as the user equipment i.

A limit value may be predefined for different radio conditions and may be a function of the radio conditions. Assume that all Packet Data Channels (PDCHs) can be used for VoIP service. Let Effective Conversational PDCH (EFCP) denote the number of timeslots currently used for VoIP service over EGPRS and U the index set corresponding to all active user equipments within the cell 140. If all user equipments using VoIP are to be satisfied, the following must be true all the times:

$$\sum_{i \in U} Wi \le \frac{EFCP}{8} \quad (2)$$

Preemption of one of the timeslots may be allowed only if the condition in equation 3 is also fulfilled for EFCP-1, or EFCP-2 in the case of using dual timeslot allocation, e.g. with the GSM feature Reduced Latency. That is, preemption of a timeslot with VoIP users may only be allowed if:

$$\sum_{i \in U} Wi + F \le \begin{cases} \frac{EFCP-1}{8}, & BTTI \\ \frac{EFCP-2}{8}, & RTTI \end{cases} \quad (3)$$

where BTTI stands for single timeslot allocation and RTTI stands for dual timeslot allocation.

A new user equipment 110 may be admitted if the user weight value W for that user equipment 110:

$$W \le \frac{EFCP}{8} - \sum_{i \in U} W_i - F \quad (4)$$

In equation 3 and 4, a safety factor F has been introduced to handle rapidly changing radio conditions. F may be set according to how quickly the radio environment varies in a cell.

As illustrated in FIG. 2, the system listens for new user equipments requesting a VoIP service. When a new user equipment 110 is detected and asks for a resource, the radio performance i of the user equipment 110 is used to calculate that user equipments weight according to equation 1. The new user equipment 110 may be accepted if the inequality in equation 4 is fulfilled. In such a case the new user equipment 110 may be admitted and the admission criterion, i.e. the right part of equation 4 may be updated. If the new user equipment 110 is not admitted, there may be performed a check if it is possible to allocate more EFCPs. If it is possible, more EFCPs may then be allocated and the admission criterion may be updated. Further, there may be a new check if the new user equipment 110 meets the admission criteria. If the user equipment 110 does not meet the admission criteria and more EFCPs cannot be allocated, the user equipment 110 may not be admitted and the admission criterion remains unchanged.

Preemption of PDCHs for the benefit of Traffic Channels (TCHs), which may admit more user equipments requesting circuit switched services, may only be admitted if the admission criteria is still met for a fewer number of EFCPs. If the inequality in equation 3 is not fulfilled, no more TCHs may be allocated at the given moment, thus no more user equipments requesting circuit switched services may be allowed.

Figure 3:
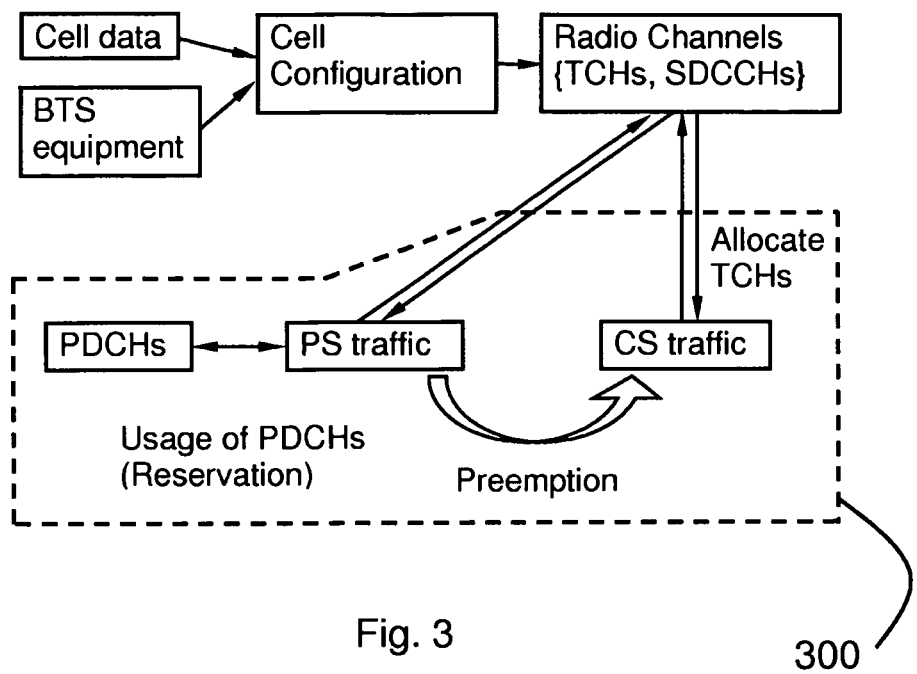
FIG. 3 is a conceptual illustration depicting mechanisms affected by the present method and arrangement.

FIG. 3 is a conceptual illustration depicting the mechanisms affected by the present method and arrangement.

The affected mechanisms are presented in the dashed area 300, to clarify the condition for preemption. Circuit switched traffic may only be able to preempt packet switched traffic with VoIP to allocate TCHs if the inequality in equation 3 is fulfilled, according to some embodiments.

Figure 4:
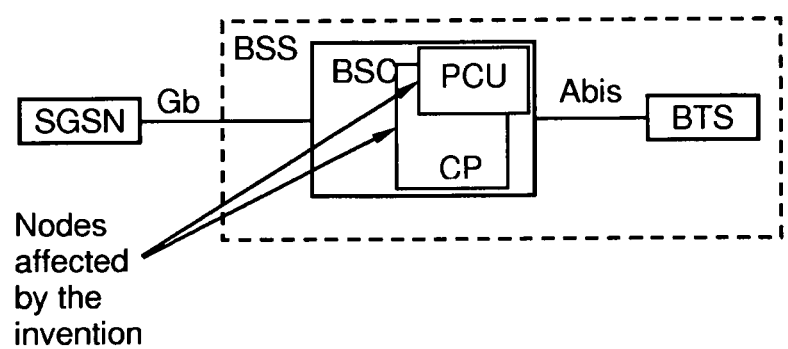
FIG. 4 is a conceptual illustration depicting possible main layout of the location of affected nodes, according to some embodiments.

The invention is supposed to be implemented in the Packet Control Unit (PCU) and the Central Processor part of the base station controller 130, as illustrated in FIG. 4. The principal layout presented in FIG. 4 provides an overview of where the affected parts are located within the wireless communication system 100. The present method may thus be implemented in these nodes, according to some embodiments.

Figure 5:
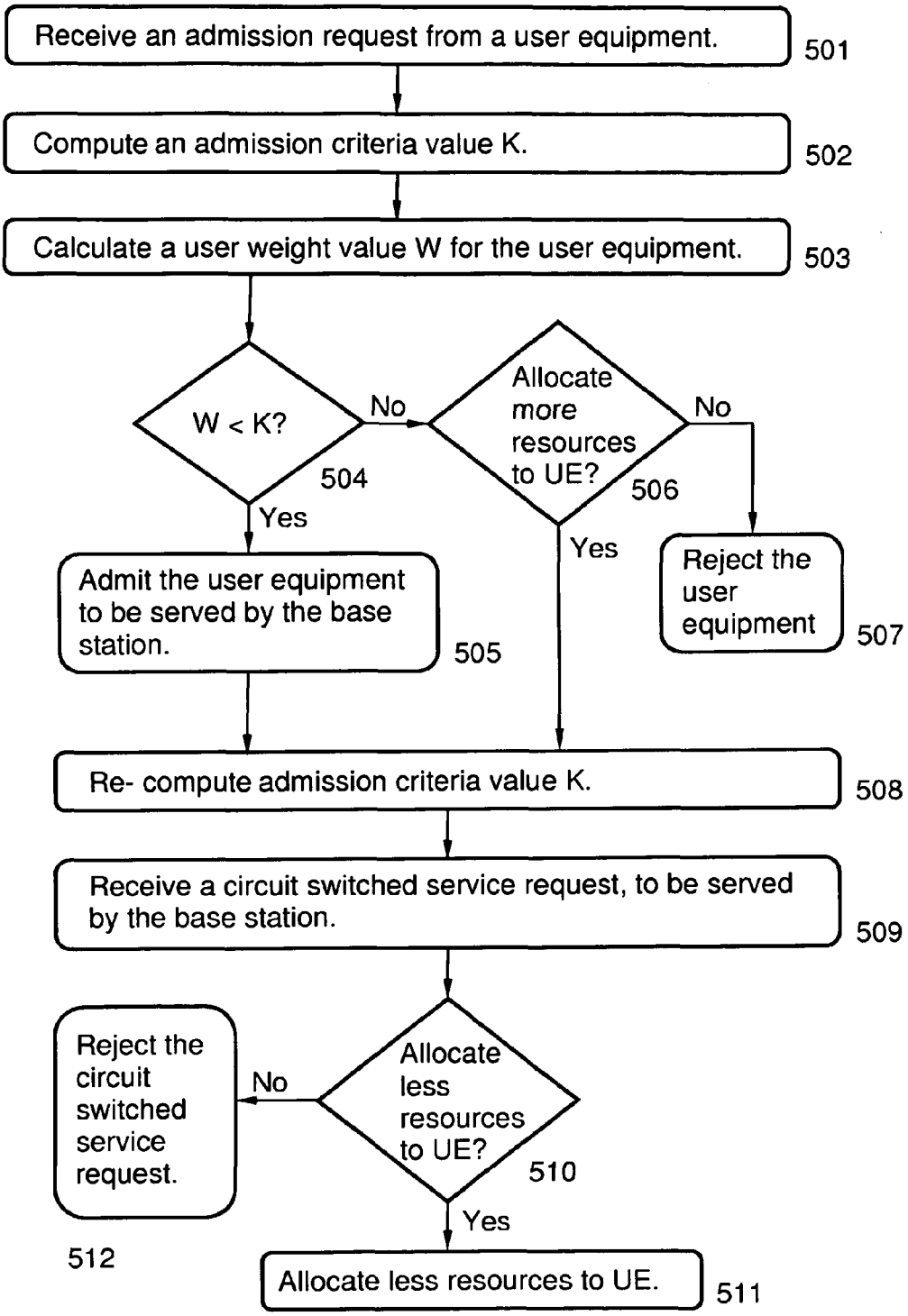
FIG. 5 is a flow chart illustrating embodiments of method steps in a base station controller.

FIG. 5 is a flow chart illustrating embodiments of method steps 501-512 in a base station controller 130. The method aims at providing admission control of a user equipment 110, to be served by a base station 120 controlled by the base station controller 130. The base station 120, the base station controller 130 and the user equipment 110 are comprised within a wireless communication system 100.

To appropriately provide admission control of the user equipment 110 to be served by the base station 120, the method may comprise a number of method steps 501-512.

It is however to be noted that some of the described method steps 501-512 are optional and only comprised within some embodiments. Further, it is to be noted that the method steps 501-512 may be performed in any arbitrary chronological order and that some of them, e.g. step 502 and step 503, or even all steps may be performed simultaneously or in an altered, arbitrarily rearranged, decomposed or even completely reversed chronological order. The method may comprise the following steps:

Step 501

An admission request e.g. for a for VoIP service, is received from the user equipment 110.

Step 502

An admission criteria value K is computed.

Optionally, the computed admission criteria value K may be based on the number of time slot currently used for providing the requested service EFCP divided by 8 minus an earlier established sum of user weight values Wi, minus a predetermined constant F.

According to some embodiments, the computed admission criteria value K may be computed such that:

$$K = \frac{EFCP}{8} - \sum_{i \in U} Wi - F$$

Step 503

A user weight value W for the user equipment 110 is computed.

Optionally, the user weight value W may be calculated by inverting the maximum number of allowed users M, which may be given the same radio conditions as the user equipment 110, or at least some of the user equipments 110.

Thus, according to some embodiments:

$$W = \frac{1}{M}$$

where M denotes the maximum number of allowed user equipments given the same radio conditions as the user equipment 110.

Step 504

The calculated user weight value W is compared with the computed admission criteria value K.

Step 505

The user equipment 110 is admitted to be served by the base station 120, if the calculated user weight value W is smaller than the computed admission criteria value K.

Step 506

This step is optional and may only be performed within some embodiments.

If the calculated user weight value W is not smaller than the admission criteria value, a check may be performed in order to try out if it is possible to allocate more resources to the user equipment 110.

Step 507

This step is optional and may only be performed within some embodiments.

If it is not possible to allocate more resources to the user equipment 110, the user equipment 110 may be rejected.

Step 508

This step is optional and may only be performed within some embodiments.

If it is possible to allocate more resources to the user equipment 110, an updated admission criteria value K may be re-computed.

Step 509

This step is optional and may only be performed within some embodiments.

If the user equipment 110 is admitted, a circuit switched service request may request PDCH resources from packet switched system users, such as e.g. the user equipment 110.

Step 510

This step is optional and may only be performed within some embodiments.

If a circuit switched service request has been received, a check may be performed, in order to try out if it is possible to allocate less resources to the user equipment 110.

Step 511

This step is optional and may only be performed within some embodiments.

If a circuit switched service request has been received, and the performed check has verified that it is possible to allocate less resources to the user equipment 110, less resources may be allocated to the user equipment 110, according to some embodiments.

Step 512

If a circuit switched service request has been received, and the performed check has verified that it is not possible to allocate less resources to the user equipment 110, the circuit switched service request may be rejected.

Figure 6:
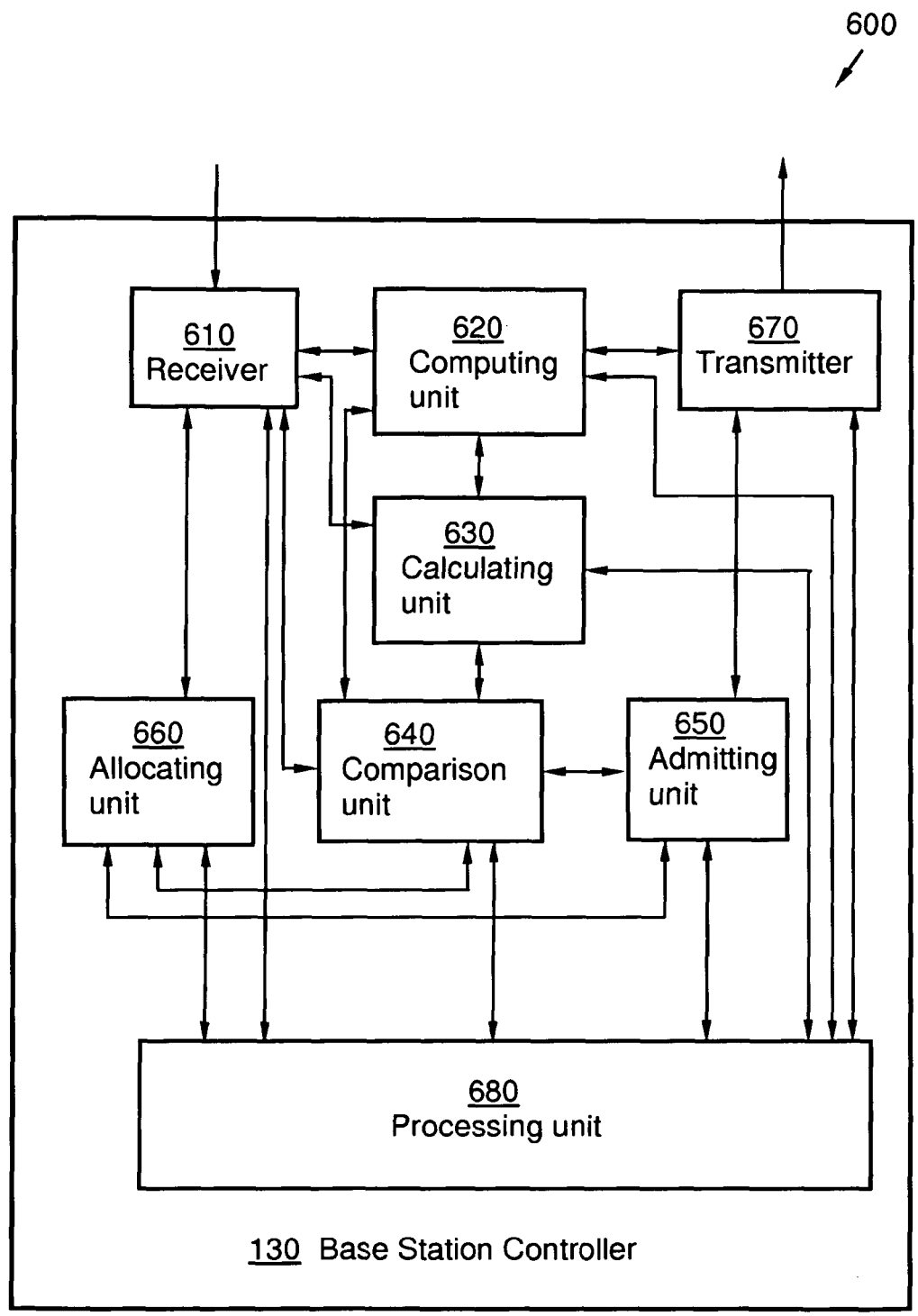
FIG. 6 is a block diagram illustrating embodiments of an arrangement in a base station controller.

FIG. 6 is a block diagram illustrating embodiments of an arrangement 600 in a base station controller 130. The arrangement 600 is configured to perform the method steps 501-512 for admission control of a user equipment 110, to be served by a base station 120 controlled by the base station controller 130. The base station 120, the base station controller 130 and the user equipment 110 are comprised within a wireless communication system 100.

For the sake of clarity, any internal electronics of the arrangement 600, not completely indispensable for understanding the present method has been omitted from FIG. 6.

The arrangement 600 in the base station controller 130 comprises a receiver 610. The receiver 610 is adapted to receive an admission request from the user equipment 110.

Further, the arrangement 600 comprises a computing unit 620. The computing unit 620 is adapted to compute an admission criteria value K.

In addition, the arrangement 600 comprises a calculator 630. The calculator 630 is adapted to calculate a user weight value W for the user equipment 110.

Also, the arrangement 600 comprises a comparison unit 640. The comparison unit 640 is adapted to compare the calculated user weight value W with the computed admission criteria value K.

Furthermore, the arrangement 600 in addition comprises an admitting unit 650. The admitting unit 650 is adapted to admit the user equipment 110 to be served by the base station 120, if the calculated user weight value W is smaller than the computed admission criteria value K.

According to some embodiments, the arrangement 600 may comprise an allocating unit 660. The allocating unit 660 may be adapted to allocate resources, according to some embodiments.

In addition, the arrangement 600 may comprise, according to some embodiments, a transmitter 670. The transmitter 670 may be arranged to transmit signals over a wired or wireless interface, according to different embodiments.

Furthermore, the arrangement 600 may, according to some embodiments, further comprise a processing unit 680. The processing unit 680 may be represented by e.g. a Central Processing Unit (CPU), a processor, a microprocessor, or other processing logic that may interpret and execute instructions. The processing unit 680 may perform all data processing functions for inputting, outputting, and processing of data including data buffering and device control functions, such as call processing control, user interface control, or the like.

It is to be noted that the described units 610-680 comprised within the arrangement 600 in the base station controller 130 may be regarded as separate logical entities, but not with necessity as separate physical entities. Any, some or all of the units 610-680 may be comprised or co-arranged within the same physical unit. However, in order to facilitate the understanding of the functionality of the arrangement 600, the comprised units 610-680 are illustrated as separate units in FIG. 6.

Thus the receiving unit 610 and e.g. the transmitter unit 670 may, according to some embodiments, be comprised within one physical unit, a transceiver, which may comprise a transmitter circuit and a receiver circuit, which respectively transmits outgoing signals and receives incoming signals via e.g. an optional antenna.

Particular Embodiments within the Base Station Controller 130

The presently described method in the base station controller 130 may be implemented through one or more processor units 680 in the base station controller 130, together with computer program code comprising instructions for performing the functions of the method steps 501-512. Thus a computer program product, comprising instructions for performing the method steps 501-512 in the base station controller 130 may perform admission control of a user equipment 110, to be served by a base station 120 controlled by the base station controller 130, when the computer program product is executed on the processing unit 680, comprised within the base station controller 130.

The computer program product mentioned above may be provided for instance in the form of a data carrier carrying computer program code for performing the method steps according to the present solution when being loaded into the processor unit 680. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station controller 130 remotely. Thus, embodiments of the present invention may take the form of an entirely hardware embodiment, a software embodiment or an embodiment combining software and hardware aspects all generally referred to herein as a circuit.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a base station controller for admission control of a user equipment, to be served by a base station controlled by the base station controller, the base station, the base station controller and the user equipment included within a wireless communication system and said method comprising:
receiving an admission request from the user equipment;
computing an admission criteria value K;
calculating a user weight value W for the user equipment, by inverting the maximum number of allowed users M, which are given the same radio conditions as the user equipment;
comparing the calculated user weight value W with the computed admission criteria value K; and
admitting the user equipment to be served by the base station, if the calculated user weight value W is smaller than the computed admission criteria value K.

2. The method of claim 1, further comprising, if the calculated user weight value W is not smaller than the admission criteria value, checking if it is possible to allocate more resources to the user equipment.

3. The method of claim 2, further comprising, if it is not possible to allocate more resources, rejecting the user equipment, and, if it is possible to allocate more resources, re-computing an updated admission criteria value K.

4. The method of claim 1, further comprising:
if the user equipment is admitted, receiving a circuit switched service request; and
checking if it is possible to allocate less resources to the user equipment, and if it is, allocating less resources to the user equipment.

5. The method of claim 1, wherein the computed admission criteria value K is based on the number of time slots currently used for providing the requested service EFCP divided by 8 minus an earlier established sum of user weight values Wi, minus a predetermined constant F, wherein the term EFCP is Effective Conversational PDCH and the term PDCH is Packet Data Channel.

6. The method of claim 1, wherein the computed admission criteria value K is computed such that:

$$K = \frac{EFCP}{8} - \sum_{i \in U} Wi - F,$$

where EFCP is Effective Conversational PDCH, which relates to the number of timeslots currently used for VoIP service of EGPRS, U is an index set corresponding to all active user equipments within a cell of the network, and F is a predetermined constant that accounts for rapidly changing radio conditions.

7. The method of claim 1, further comprising, if a circuit switched service request has been received, and if it is not possible to allocate less resources to the user equipment, rejecting the circuit switched service request.

8. An arrangement in a base station controller for admission control of a user equipment to be served by a base station controlled by the base station controller, wherein the base station controller and base station are configured for use in a wireless communication system, and said arrangement comprising:
a receiver configured to receive an admission request from the user equipment;
a computing unit configured to compute an admission criteria value K;
a calculator configured to calculate a user weight value W for the user equipment by inverting the maximum number of allowed users M, which are given the same radio conditions as the user equipment;
a comparison unit configured to compare the calculated user weight value W with the computed admission criteria value K; and
an admitting unit configured to admit the user equipment to be served by the base station, if the calculated user weight value W is smaller than the computed admission criteria value K.

* * * * *